United States Patent [19]
Eglit

[11] Patent Number: 5,768,507
[45] Date of Patent: Jun. 16, 1998

[54] METHOD AND APPARATUS FOR OVERCOMING A SLOPE OVERLOAD CONDITION WHILE USING DIFFERENTIAL PULSE CODE MODULATION SCHEME

[75] Inventor: Alexander Julian Eglit, San Carlos, Calif.

[73] Assignee: Cirrus Logic, Inc., Fremont, Calif.

[21] Appl. No.: 536,577

[22] Filed: Sep. 29, 1995

[51] Int. Cl.$^6$ .................................................. H01J 31/00
[52] U.S. Cl. ............................. 395/200.32; 345/520
[58] Field of Search ........................ 364/514 R, 715.02; 395/114, 200.32; 348/394, 403, 415; 382/236, 238; 345/501, 520

[56] References Cited

U.S. PATENT DOCUMENTS

| | | | |
|---|---|---|---|
| 5,014,127 | 5/1991 | Richards | 358/133 |
| 5,235,429 | 8/1993 | Fukushima | 358/230 |
| 5,253,058 | 10/1993 | Gharavi | 358/136 |
| 5,323,188 | 6/1994 | Kawayachi et al. | 348/412 |
| 5,353,061 | 10/1994 | Rodiquez et al. | 348/409 |
| 5,379,351 | 1/1995 | Fandrianto et al. | 382/41 |
| 5,406,306 | 4/1995 | Siann et al. | 345/115 |
| 5,408,542 | 4/1995 | Callahan | 382/56 |
| 5,420,942 | 5/1995 | Levit | 382/276 |
| 5,442,718 | 8/1995 | Kobayashi et al. | 382/166 |
| 5,574,572 | 11/1996 | Malinowski et al. | 348/451 |

*Primary Examiner*—James P. Trammell
*Assistant Examiner*—Thomas Peeso
*Attorney, Agent, or Firm*—Robert P. Bell; Steven A. Shaw

[57] ABSTRACT

A display controller to upscale a source video image for display on a display unit of a computer system. An encoder circuit in the display controller circuit stores in a local memory pixel data of previous scan lines required for interpolation in a compressed format using differential pulse code modulation (DPCM) scheme. Encoder circuit avoids a slope overload condition by generating compressed data for a first pixel of each scan line by using the first pixel itself as a reference. Encoder circuit generates compressed data for other pixels by using at least one prior pixel in the corresponding scan line. A decoder circuit decompresses the pixel data into original format prior to sending to an interpolator. The interpolator receives a present scan line and the decompressed data of previous scan lines, and interpolates the received pixels to generate additional pixels required for upscaling the source video image.

20 Claims, 8 Drawing Sheets

Figure 1

METHOD AND APPARATUS FOR OVERCOMING A SLOPE OVERLOAD CONDITION WHILE USING DIFFERENTIAL PULSE CODE MODULATION SCHEME

CROSS REFERENCE TO RELATED APPLICATIONS

The subject matter in this application is related to that in co-pending U.S. application Ser. No. 08/536,315, filed on Sep. 29, 1995, entitled "A METHOD AND APPARATUS FOR UPSCALING VIDEO IMAGES IN A GRAPHICS CONTROLLER CIRCUIT" filed concurrently herewith.

FIELD OF THE INVENTION

The present invention relates generally to computer graphics systems and more specifically to a method and apparatus for upscaling video images using a graphics controller circuit.

BACKGROUND OF THE INVENTION

A need frequently arises to upscale video images while displaying these video images on computer systems. For example, a CD-ROM decoder in a computer system may generate a source video image of size 160×120 pixels and the image may be displayed on a display area of size 640×480 pixels on a display screen of the computer system. In such a situation where size of a display image is larger than size of a source image, the source video image may be upscaled to the larger display image while still maintaining the characteristics of the source video image.

Interpolation is a well-known prior art technique used for upscaling video images. In an interpolation scheme, several adjacent pixels in a source video image are typically used to generate additional new pixels. FIG. 1 shows pixels (A–H) of a source video image and pixels (Rxx) that are additionally generated by interpolation to upscale the source video image. Pixel R12 may be generated, for example, by formula ($\frac{2}{3}A+\frac{1}{3}B$).

If each pixel is represented in RGB format, RGB components of pixel R12 may be generated by using corresponding components of pixels A, B. Pixel R51 may similarly be generated using the formula ($\frac{1}{3}A+\frac{2}{3}C$). Generation of pixels such as R12–R15 may be termed horizontal interpolation as pixels R12–R15 are generated using pixels A, B located horizontally. Generation of pixels such as R21–R51 may be termed vertical interpolation.

Graphic controller circuits in prior art computer systems may use a display memory to store source image pixel data prior to upscaling source video images. Such graphics controller circuits may store pixel data in a scan line dominant order, i.e. pixel data corresponding to a given scan line may be stored in consecutive locations in display memory prior to storing pixel data of a subsequent scan line. Such a scan line dominant order of storing may cause pixel data of different scan lines to be stored in different pages of display memory.

During vertical interpolation of source image data, throughput performance problems may be encountered in a scan line dominant order of storing scheme as vertical interpolation may require pixels from different scan lines. Accessing different scan lines may require retrieving data from different pages of display memory, thereby forcing a non-aligned or non-page mode read access. A non-page mode read access may require more clock cycles than a page mode access for memory locations within a pre-charged row. Thus the average memory access time during vertical interpolation may be much higher than consecutive memory accesses within a same row. High average memory access time during vertical interpolation may result in a decrease in overall throughput performance of a graphics controller circuit.

To minimize number of accesses across different rows, a graphics controller circuit may retrieve and store pixel data of a source video image scan line in a local memory element. For example, with respect to FIG. 1, a graphics controller circuit may retrieve and store all pixels corresponding to scan line A-B and store retrieved pixels in a local memory located in the graphics controller circuit. The graphics controller circuit may then retrieve pixels corresponding to scan line C-D (i.e. Row 6), and interpolate using pixels stored in the local memory.

One problem with such a scheme employing local memory is that a large local memory may be required. For example, to store 720 pixels of a scan line with each pixel being represented in RGB format, and with each of RGB components stored as eight bits, a memory of size 720×3× 8=17280 bits may be required. Such a large local memory may increase cost of graphics controller circuits and require additional silicon space.

To minimize amount of storage space required in such local memory, a graphics controller circuit may store source video image pixel data in a compressed format in local memory. The graphics controller circuit may decompress source video pixel data stored in a compressed format, and use decompressed pixel data for interpolation to generate additional pixels. As the graphics controller stores the source video image pixel data in compressed format, the amount of storage space required in local memory may be reduced.

Such a graphics controller circuit may compress source video pixel data using a scheme such as differential pulse code modulation (DPCM) to take advantage of high correlation between adjacent pixels in a video image. In a DPCM scheme, a graphics controller may generate compressed data for each pixel data of a source video image scan line as a function of one or more prior pixel data in the scan line. For example, with reference to FIG. 1, to generate compressed data for source video image pixel G, a graphics controller circuit may generate a predicted value based on two prior source video image pixel data values A and B, subtract pixel data value G from the predicted value, and quantize the result of subtraction to generate compressed pixel data for pixel G.

FIG. 8 comprises two graphs illustrating an example of differential pulse code modulation. X1-axis of the first graph represents a clock cycle during which a graphics controller may process a pixel, the value of which is represented on Y1-axis. The second graph represents a quantization function with Y1-axis representing a difference computed from a predicted value of a pixel, and X1-axis representing a quantized value onto which the difference may be mapped. The quantized value may represent compressed pixel data value for the pixel.

Assuming values of 115 and 110 (shown with reference to Y1-axis) for source video image pixel data A and B (of FIG. 1) received at times T800 and T801 respectively, a graphics controller may generate 120 (shown along axis Y1) for predicted value (P) for next pixel G by extrapolating 115 and 110. If G has a pixel data value of 129, graphics controller circuit may generate a difference value 9 by subtracting predicted value P from pixel data value of G. Graphics controller circuit may quantize 9 (using quantization function represented by second graph) using one of several well-known techniques to generate a value to fit in a desired number of bits of the compressed data.

The second graph in FIG. 8 with axis Y2 and X2 illustrates the operation of a linear quantizer. It will however be appreciated that it is within the scope and spirit of the present invention to use either a linear quantizer or a non-linear quantizers. Only the positive side of the quantizer is shown for purposes of clarity, and the quantizer may comprise a negative side also as is well-known in the art. The quantizer may operate with predicted value P as a reference point for quantizing pixel G. Pixel G is shown with reference to both axis Y2 (with value J=9 which represents difference from predicted value P) and Y1 (with value 129 which represents pixel data value).

Such quantizer may map difference value 9 (shown on the Y2-axis) to value Q on the X2-axis according to a quantization function represented by a graph with axis X2-Y2 to generate a quantized value for source video image pixel G. Quantized values are generally represented in lesser number of bits than pixel data values, thereby achieving desired compression. A quantized value may be stored as compressed pixel data.

Quantizers may map all difference values above a certain value to a maximum number that may be represented by number of bits in quantization output. With reference to the graph in FIG. 8, all values above A1 may be mapped to B1. A range defined by 0 and A1 may be termed the aperture of a quantizer. Quantizers may have an aperture on a negative side also as is well known in the art.

As will be appreciated from above explanation, a graphics controller circuit may generate a predicted value as a function of prior pixels for each pixel data, and use the predicted value as a reference point for a quantizer. A graphics controller circuit may quantize the difference of reference point and pixel data value to generate compressed data value for a pixel data. A graphics controller may generate a predicted value for each pixel and generate compressed pixel data in a similar manner.

A problem may arise while generating compressed data value for first pixel of a scan line as pixels prior to first pixel may be non-existent. A reference point value for a first pixel may be indeterminate or undefined. If a difference is generated from such undefined value, the difference may not fit into quantization aperture and a slope overload condition, explained below with reference to FIG. 7, may result.

In FIG. 7, during time period T0-T1, pixel data of a video signal may be illustrated with a value of 0, for example, as pixels corresponding to blanking interval have been processed. At time T1, first pixel of a scan line may be received with pixel data value of 60. Assuming a four bit quantization output and a linear quantizer function, a quantizer may have an aperture of only 16. Thus the quantizer may represent a maximum increase of only 16 during each period. Hence, output displayed may have a pixel data value of 16 during period T1-T2, 32 during T2-T3, and 48 during T3-T4. Eventually at time T4, the pixel data displayed may equal source pixel data.

A slope overload condition is said to be present during the period T1-T4 when the pixel data displayed is not equal to source video pixel data as a result of quantization aperture not being greater than or equal to the change in input signal value. A slope overload condition may lead to a display wherein the edges may be blurred but gradually brightening as the display is observed towards the center.

SUMMARY AND OBJECTS OF THE INVENTION

The present invention comprises a graphics controller chip which may use differential pulse code modulation to compress video pixel data, and avoid a slope overload condition while displaying first pixel of a scan line. The graphics controller circuit of the present invention comprises an encoder circuit which receives a set of pixel data for a present scan line and generates a predicted value for each pixel data normally from at least one prior pixel data within the present scan line. However, an override circuit causes the encoder circuit to generate a predicted value for the first pixel data of the present scan line as a function of the first pixel data.

The encoder circuit may generate a compressed pixel data for each pixel data as a function of the corresponding predicted value. The encoder circuit may use DPCM scheme to encode and decode the pixel data. As the encoder circuit generates predicted value for the first pixel data as a function of the first pixel, a slope overload condition may be avoided.

The graphics controller circuit may also include a local memory coupled to receive and store the compressed pixel data set. A decoder circuit may decompress the compressed pixel data set to generate a decompressed pixel data set. An interpolator may interpolate the decompressed pixel data set and the set of pixel data for a subsequent scan line to generate a set of additional pixel data comprised in the upscaled video image.

A DPCM encoder of the present invention may comprise a first adder for generating a difference of the pixel data and the corresponding predicted value. A first quantizer may generate the compressed pixel data set by quantizing the difference for each pixel data. The DPCM encoder may further comprise a first recoverer circuit for generating a recoverer value from the compressed pixel data set, and a second adder may add the recoverer value with the predicted value to generate an output. The DPCM encoder may also include a first predictor to generate the predicted value for a next pixel as a function of the output of the second adder.

An override circuit of the present invention may comprise a second quantizer and a second recoverer which may generate a predicted value for a first pixel. The override circuit may also include a first multiplexor for selectively coupling the predicted value for the first pixel while processing the first pixel data, and for coupling the predicted value generated by the predictor when processing subsequent pixel data.

The decoder circuit in the graphics controller circuit may include a third recoverer coupled to the local memory for receiving each compressed data, and for generating a third recoverer value corresponding to each compressed data. Decoder circuit may also include a second predictor for generating a second predicted value for each pixel data. A second multiplexor may be coupled to receive the predicted value for the first pixel and the second predicted value for each pixel data as inputs, and select as output the predicted value for the first pixel when the third adder receives the third recoverer value of the first pixel data, and the second predicted value otherwise. A third adder may add output of second multiplexor to corresponding third recoverer value to generate the decompressed pixel data set.

After the interpolator generates the upscaled video image by interpolating the decompressed pixel data set and the pixel data for the subsequent scan line, graphics controller circuit may generate display signals to generate signals to display the upscaled video image.

It is therefore an object of the present invention to avoid a slope overload condition while display first pixel data of a scan line.

It is another object of the present invention to store pixel data in a compressed format in the local memory.

It a further object of the present invention to decrease the size of local memory which may be required for storing pixel data for upscaling video images.

It is yet another object of the present invention to use a DPCM scheme to compress and decompress pixel data.

BRIEF DESCRIPTIONS OF THE DRAWINGS

Figure 1:
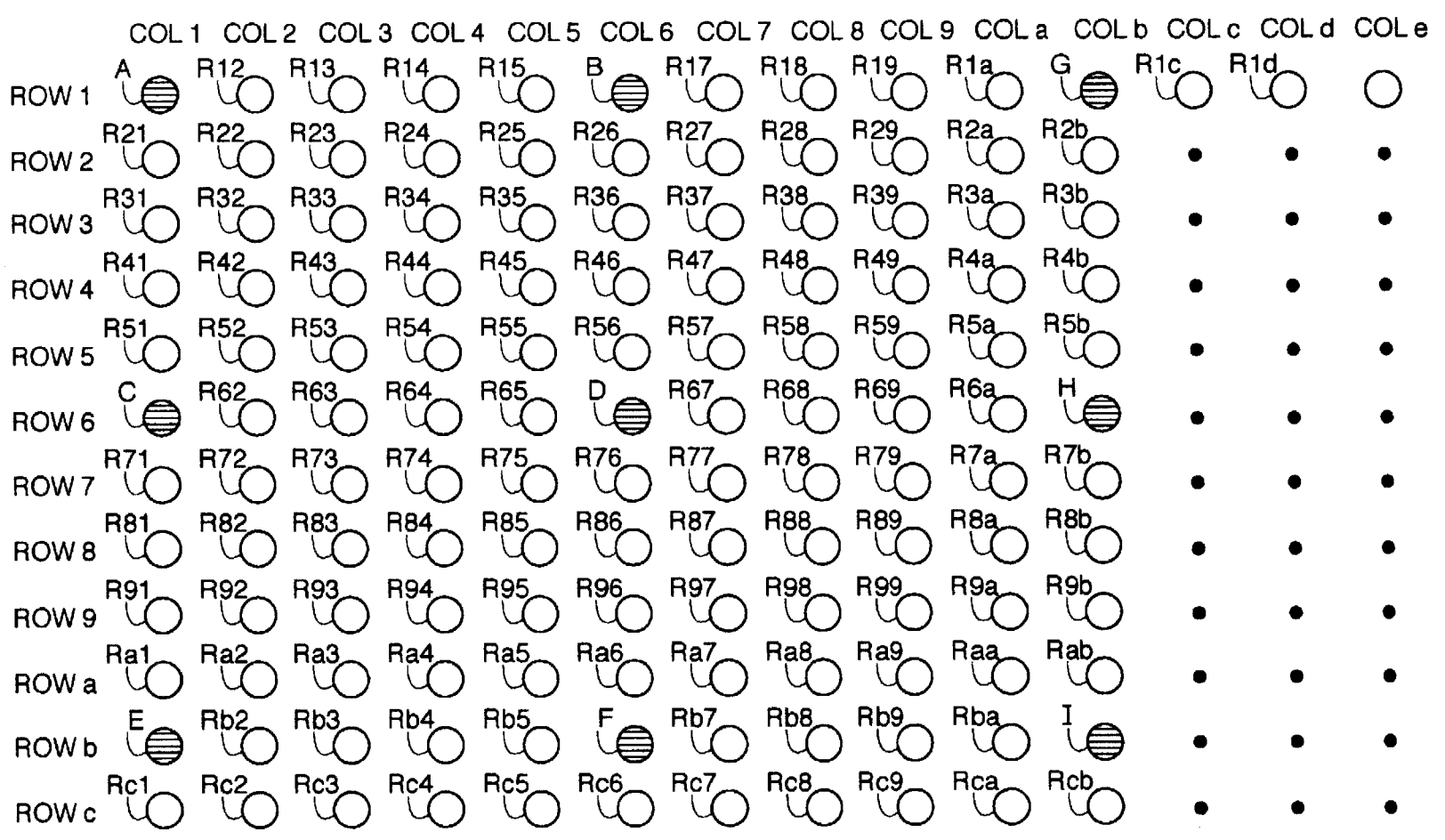

FIG. 1 is a diagram illustrating pixels in a source video image and the additional pixels in a corresponding upscaled image.

DETAILED DESCRIPTION OF THE INVENTION

Figure 2:
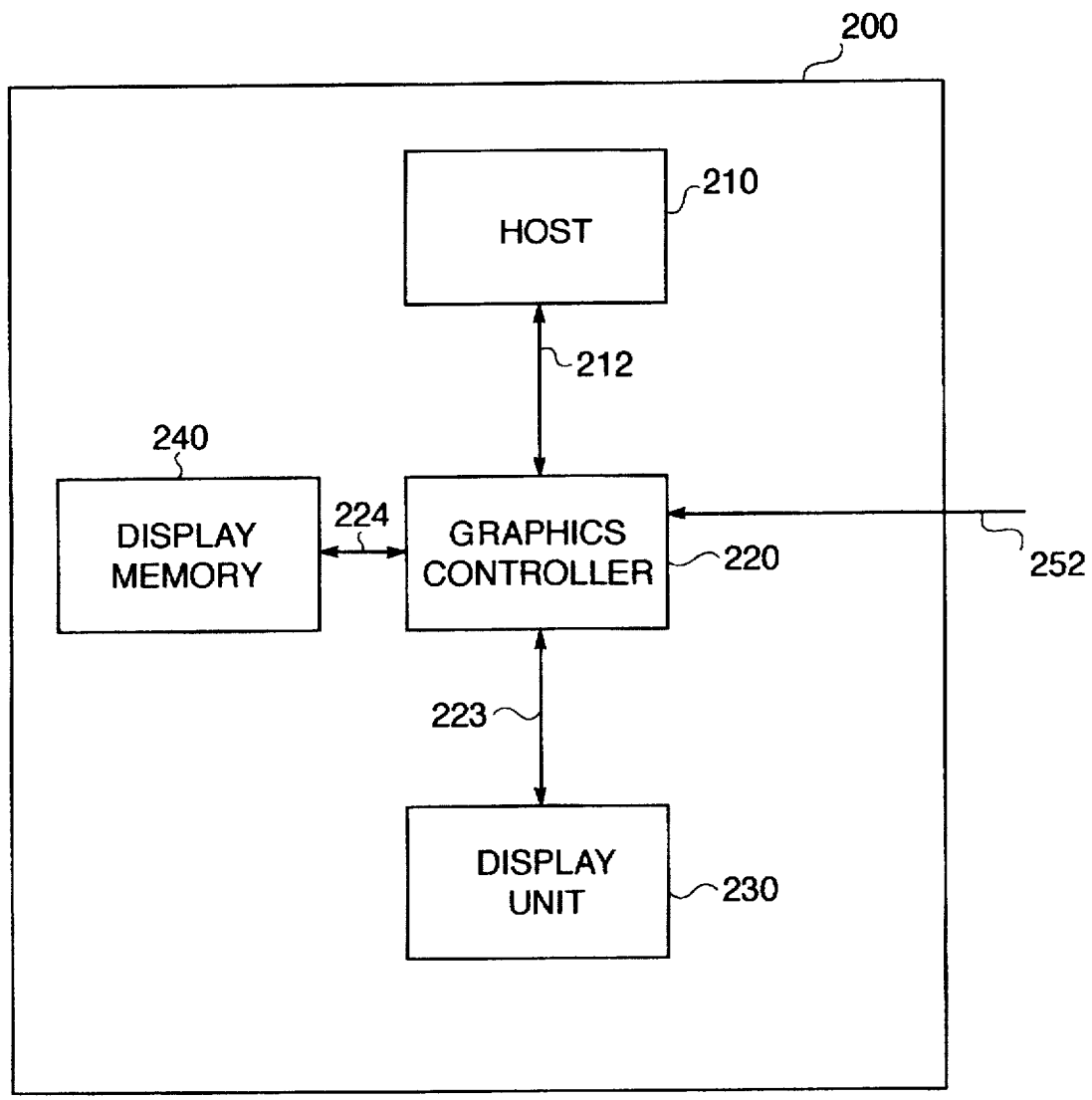
FIG. 2 is a block diagram of a computer system of the present invention comprising a host, a display memory, a graphics controller circuit and a display unit.

FIG. 2 is a block diagram of a computer system 200 of the present invention comprising a Host 210, a Graphics Controller 220, a Display memory 240 and a Display Unit 230. Display memory 240 may be integrated with Graphics Controller 220 as one unit.

Graphics Controller 220 may receive video data of a source video image from an external device such as a video decoder (not shown) over video path 252 or from Host 210, and store the received video data in Display memory 240. Graphics Controller 220 may then retrieve scan line data from Display memory 240, compress the scan line data using differential pulse code modulation (DPCM), and store the compressed data in a local memory. As a part of the DPCM scheme, Graphics Controller 220 may generate compressed data for each pixel data as a function of prior pixels in the scan line as explained in background of the invention.

However, to generate compressed data for a first pixel of a scan line, Graphics Controller 220 of the present invention includes a override circuit to compute a reference point (predicted value) for the first pixel data based on first pixel data. As the reference point is computed based on the first pixel data, the difference of reference point and the first pixel data fits within an aperture of quantizer of DPCM scheme, thereby avoiding a slope overload condition. Without such an override circuit, the reference point for calculating difference in DPCM scheme may be undefined as pixels data prior to first pixel data may be non-existent, and lead to a slope overload condition as explained in the background of the invention.

Graphics Controller 220 may decompress the compressed data and use the decompressed data for interpolation with subsequently received scan line data. By storing pixel data in compressed format, Graphics Controller 220 minimizes the amount of local memory required for storing scan line data prior to interpolation.

Override circuit in Graphics Controller 220 of the present invention may further include a communication path to provide the reference point calculated for first pixel data to decompression process which enables the decompression process to accurately reproduce first pixel data value. Hence, Graphics Controller 220 of the present invention reproduces first pixel data accurately, and accordingly avoids a slope overload condition.

Continuing with reference to FIG. 2, Host 210 may send graphics/text/video data over System Bus 212 to Graphics Controller 220. System Bus 212 may comprise, for example, a PCI bus. Graphics data may be received in a RGB 565 format. It will however be appreciated that the graphics data may be in any other format or with different number of bits of representation without departing from scope and spirit of the present invention.

Graphics Controller 220 may receive graphics/text/video data over System Bus 212 and store in Display memory 240 the graphics/text/video data along with any video data received over video path 252. Video data may comprise a television signal or any video image encoded in RGB format or YUV format or any other format for encoding video image. For example, the video data can be pixel data corresponding to a Full MotionVideo™ Architecture (MVA™) image. Motion Video Architecture™ and MVA™ are trademarks of Cirrus Logic, Inc., Fremont California Graphics. Controller 220 may then display the display data comprising all of video data, text data and graphics data on Display Unit 230.

Display memory 240 stores display data comprising video/graphics/text data before the display data is displayed on Display Unit 230. Display memory 240 may comprise a random access memory. Display memory 240 may also be known as a video memory or VMEM in the graphic controller arts. However, due to the advent of Motion Video displays in computer systems, the term "video memory" may be a misnomer. Thus, for the purposes of this application, such a memory will be referred to as a display memory.

Figure 3:
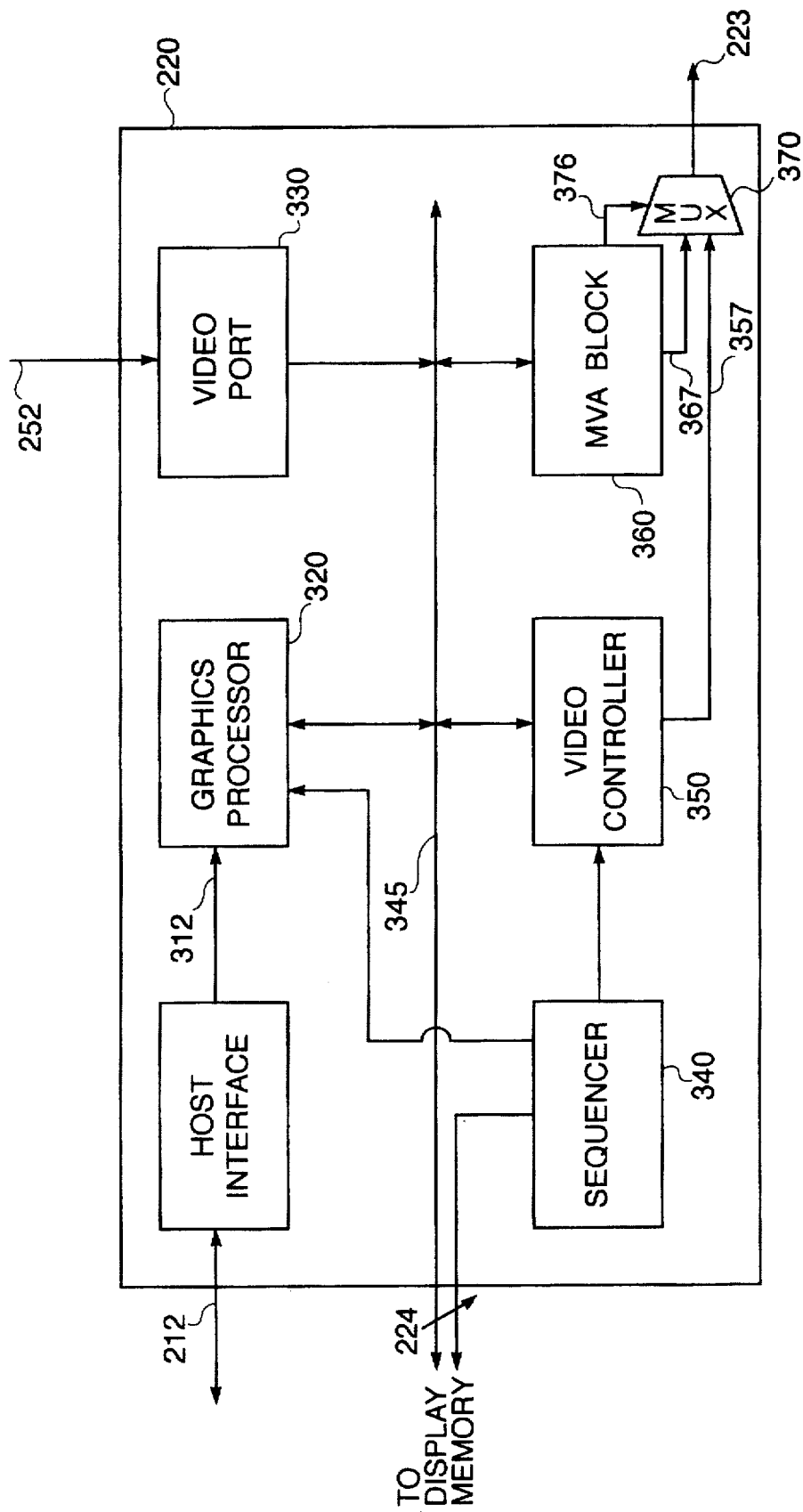
FIG. 3 is a block diagram of the graphics controller of the present invention including a MVA block where upscaling is performed.

FIG. 3 is a block diagram of graphics controller 220 of FIG. 2. Motion Video Architecture™ (MVA) block 360 may receive video data over bus 345, and upscale the video data by manipulating the source video data received. MVA Block 360 may interpolate pixel data in the source video data to achieve such upscaling/downsizing. Source video pixel data may be stored in a compressed format using differential pulse code modulation (DPCM) prior to interpolation. Such storing in compressed format minimizes the amount of local memory required for storing the pixels of the source video data.

MVA block 360 of the present invention further includes a override circuit to avoid slope overload condition while processing first pixel data of a scan line. MVA Block 360 sends pixel data corresponding to the upscaled video image to Multiplexor 370 over a second mux input line 367.

Multiplexor 370 accepts as input RGB bits corresponding to graphics/text data and video data on mux input lines 367 and 357 respectively, and selects as output one of the two inputs under the control of mux select signal 376 asserted by MVA Block 360. If display on display unit 230 at present screen refresh time corresponds to video data, mux select signal 376 is de-asserted so as to select video data on mux input line 367. On the other hand, if the display on the display unit 230 corresponds to graphics/text data sent by Host 210, mux select signal 376 is asserted so as to select the graphics/text data on mux input line 357.

Sequencer 340 provides timing control to Video Controller 350, Graphics Processor 320, and Display memory 240. Timing control may include various dot (pixel) clocks and horizontal count resolution.

Figure 4:
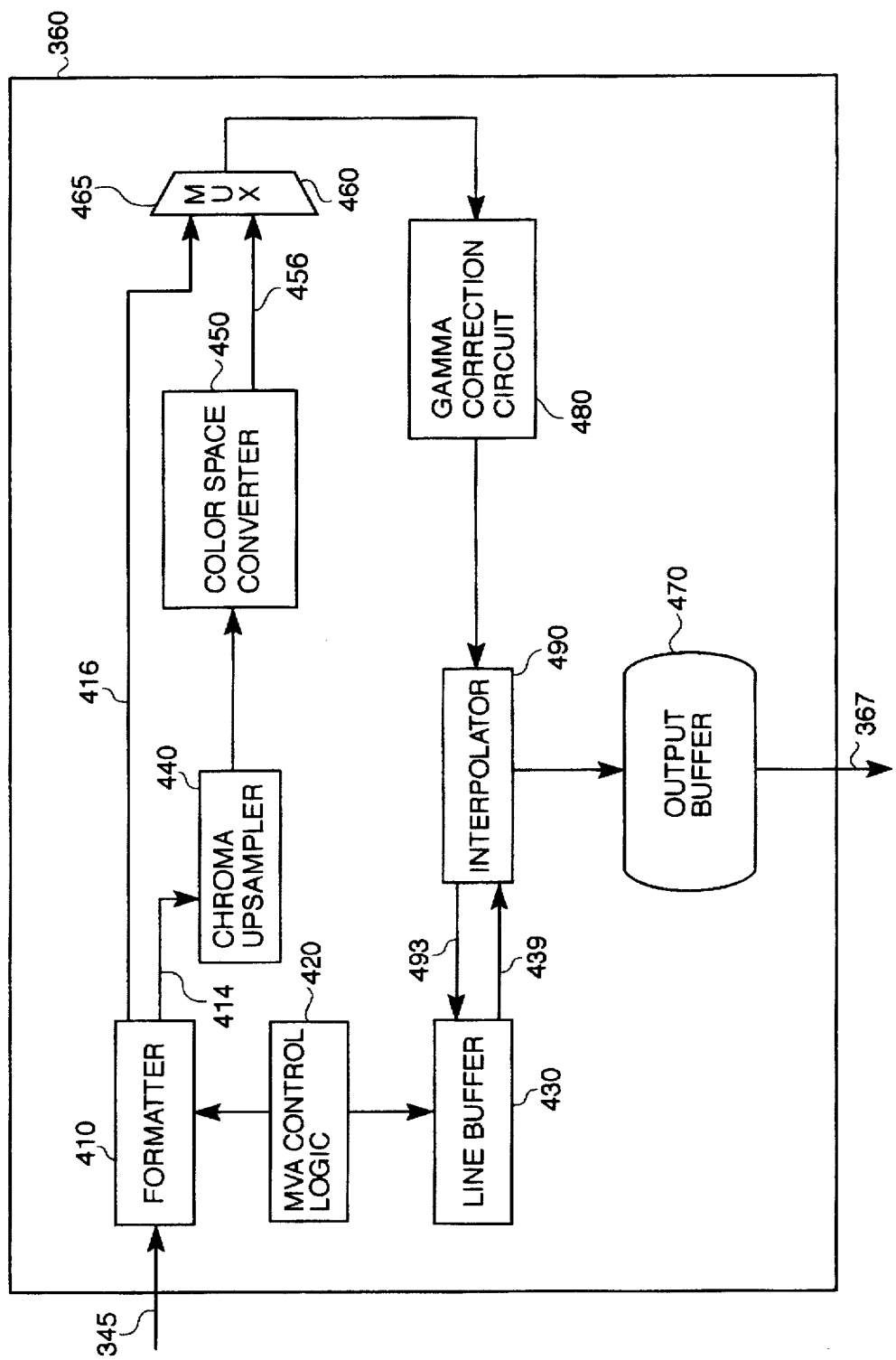
FIG. 4 is a block diagram of the MVA Block with an interpolator receiving pixels of previous scan lines from a line buffer storing the corresponding pixel data in a compressed format.

FIG. 4 is a block diagram of MVA Block 360 of the present invention. MVA Block 360 comprises Formatter 410, Chroma Upscaler 440, Color Space Converter 450, MVA Control Logic 420, Line Buffer 430, YUV-RGB Select Multiplexor 460, Interpolator 490, Gamma Correction Circuit 480, and Output Buffer 470.

Line Buffer 430 may receive pixel data of a current scan line in an RGB 888 format, store received pixel data in a compressed format and then decompress the compressed data to provide Interpolator 490 video pixel data in the original RGB 888 format. Interpolator 490 may use such video pixel data for interpolation in conjunction with a subsequent scan line. Since Output Buffer 470 stores video pixel data in a compressed format, the amount of memory required on MVA Block 360 is reduced. Line Buffer 430 of the present invention may further include a override circuit to avoid slope overload condition while processing first pixel data of a scan line.

Formatter 410 may receive source video image pixel data from Display memory 240 over bus 345. Received video data may be in any format such as RGB 555 format or RGB 888 or YUV 422. Formatter 410 converts RGB 555 or 565 data into RGB 888 format, and sends converted data over a 24-bit bus 416. Formatter 410 therefore converts received pixel data into an expected pixel format. If source video data is in a YUV format, Formatter 410 sends YUV signals over bus 414.

Chroma Upsampler 440 upsamples the chroma component of the YUV signal to compensate for potential down-sampling of the chroma signals while transmitting the source video signal to the computer system. Such down-sampling is typically done while scanning a television signal to take advantage of low spacial resolution for chroma compared to luminance in the human eye. Color Space Converter 450 converts the input YUV signal to RGB 888 format before sending such RGB 888 format data over 24-bit bus 456.

YUV-RGB Select Multiplexor 460 receives as input source video data in RGB 888 format on input lines 416 or 456 depending on whether source video data is in RGB or YUV formats respectively. YUV-RGB Select Multiplexor 460 selects one of the two inputs under control of input YUV-RGB Select Signal 465, which is typically driven from a bit in a register programmed by a user. Gamma Correction Circuit 480 removes gamma values from a video signal and is conventional in the art.

Interpolator 490 receives pixel data of scan lines from Gamma Correction Circuit 480 and interpolates the received pixels to upscale the source video data. Interpolator 490 may perform horizontal interpolation corresponding to source video scan lines as the corresponding pixel data is received from Gamma Correction Circuit 480. Since the scan lines are scanned in a horizontal manner, horizontal upscaling may not require line buffering as in vertical interpolation.

To perform vertical interpolation, Interpolator 490 stores pixel data of each scan line in Line Buffer 430 and use pixel data of the scan line for vertical interpolation in conjunction with subsequently received scan line data. In other words, Interpolator 490 may receive a scan line data from Gamma Correction Circuit 480, and uses scan line data previously stored in Line Buffer 430. It will be appreciated that Interpolator 490 may store multiple scan lines in Line Buffer 430 and use such multiple scan lines for interpolation without departing from scope and spirit of the present invention.

As a horizontal scan line is generated, Interpolator 490 may store corresponding pixel data (including interpolated pixels) in Output Buffer 470. Such stored pixel data may then be available as input to Multiplexor 370 on signal line 367. Horizontal scan lines may be generated as a result of both vertical and horizontal interpolation.

Line Buffer 430 receives and stores scan line data in compressed format using differential pulse code modulation (DPCM) format. Line Buffer 430 may store data corresponding to multiple scan lines depending on the number of scan lines required for vertical interpolation. However, in the preferred embodiment only one scan line is typically stored. It is therefore within the scope and spirit of the present invention to store pixel data for multiple scan lines in Line Buffer 430.

Figure 5:
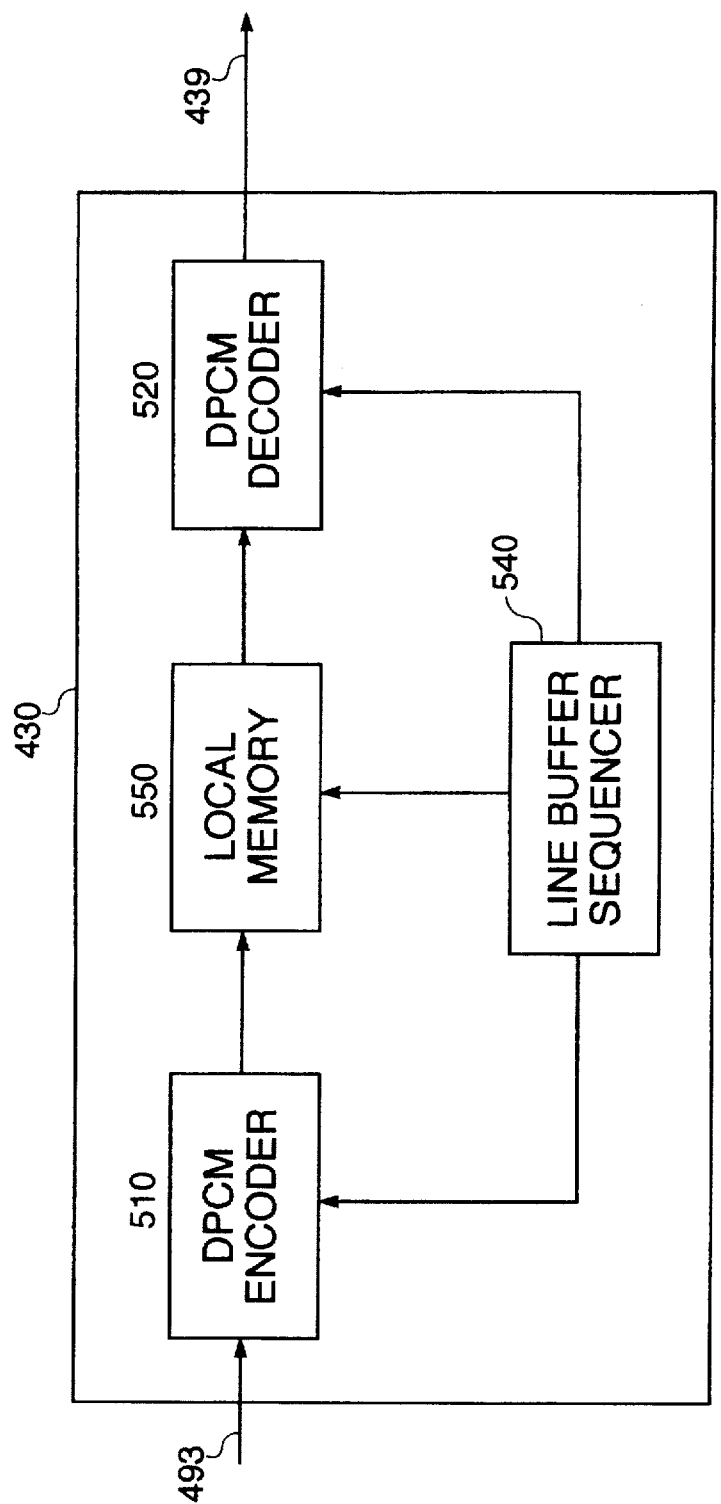
FIG. 5 is a block diagram of the line buffer comprising a DPCM encoder, a local memory and a DPCM decoder.

FIG. 5 is a block diagram of Line Buffer 430 of the present invention. Line Buffer 430 comprises DPCM Decoder 520, DPCM Encoder 510, Local Memory 550, and Line Buffer Sequencer 540 for each of the RGB components of each pixel. In the interest of conciseness, circuitry for only one of the three colors is shown and explained. However, Buffer Sequencer 540 may be shared by circuitry for all three colors.

DPCM Encoder 510 receives source video data from Interpolator 490, compresses the corresponding pixel data using DPCM, and stores compressed DPCM data in Local Memory 550. Since there is generally a high correlation between adjacent pixel data values in video data (e.g., television signals), source video data lends itself to application of DPCM to compress pixel data.

DPCM Encoder 510 may compresses 24-bit RGB data into 12 bits in the preferred embodiment. It will however be apparent to one of ordinary skill in the art that Line Buffer 430 may be designed using a different compression technique or a different number of bits without departing from the spirit and scope of the present invention.

DPCM Decoder 520 retrieves compressed DPCM data (i.e. 12 bits per pixel) from Local Memory 550, decompresses the DPCM data to provide pixel data to Interpolator 490 in the original RGB 888 format. Buffer Sequencer 540 coordinates and controls the operations of DPCM Encoder 510, and DPCM Decoder 520.

Local Memory 550 is designed to store at least 768 pixels to accommodate the Square Pixel PAL format, which may be the maximum number of pixels per scan line in standard industry scanning formats. Local Memory 550 may comprise an SRAM unit for faster access.

In the preferred embodiment of Local Memory 550, pixel data for only one scan line is stored. Therefore, Local Memory 550 of the preferred embodiment comprises 768× 12 bits. However, a different number of bits may be required to store more scan lines or more pixels per scan line.

It will be appreciated that the amount of memory required may be reduced to half by compressing source pixel data into half using DPCM. However, additional circuitry to support compression (encoder) and decompression (decoder) is required to support such reduced memory. It will be further appreciated that although the present invention is explained with reference to DPCM, other compression schemes may be used without departing from the scope and spirit of the present invention.

Also, DPCM Encoder 510 and DPCM Decoder 520 may be located in different systems. For example, DPCM Decoder 520 may be located in a system such as a television set, and the DPCM Encoder 510 may be located in a broadcast station.

Figure 6:
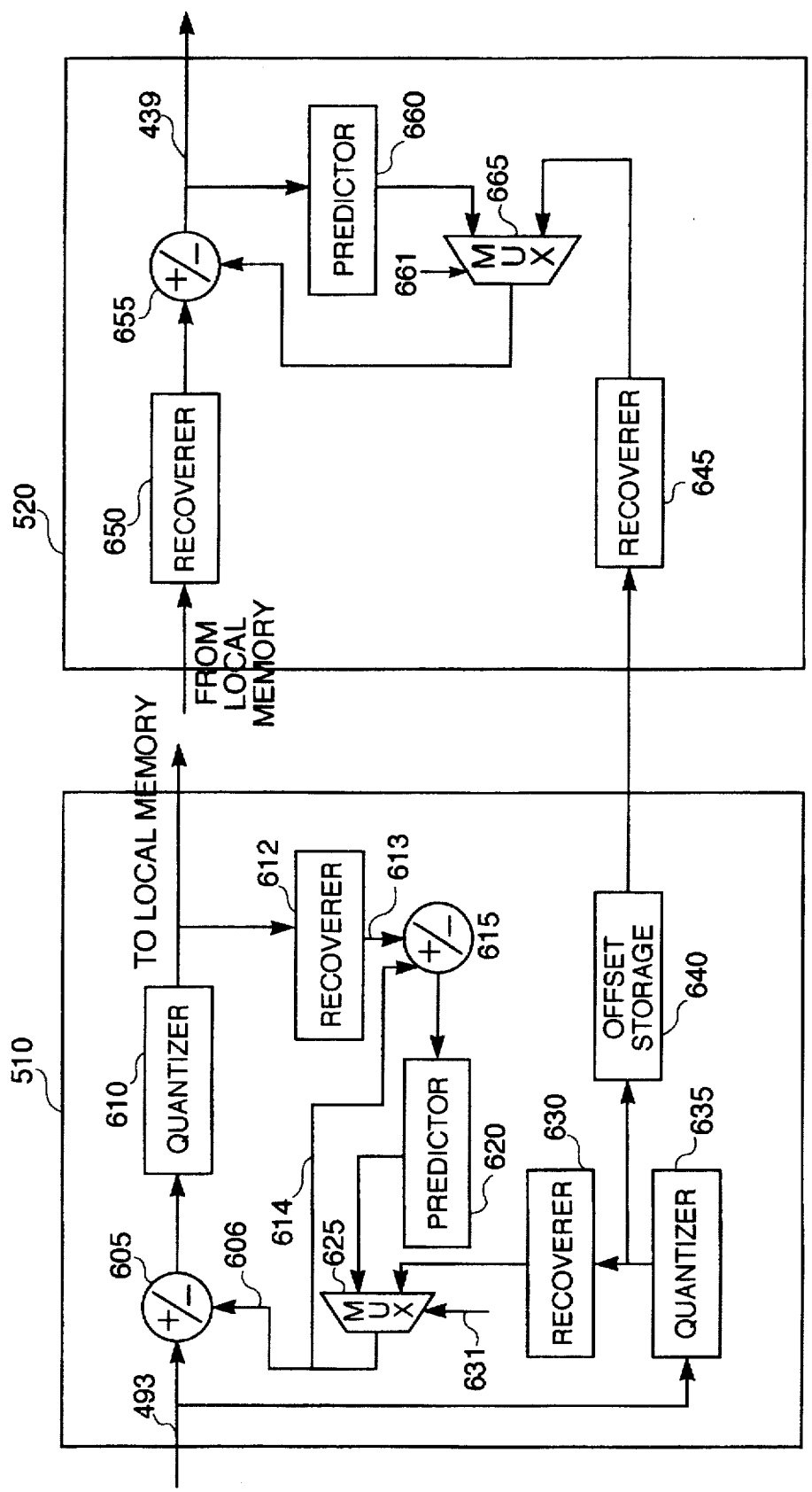
FIG. 6 is a detailed block diagram of DPCM encoder and DPCM decoder.
Figure 7:
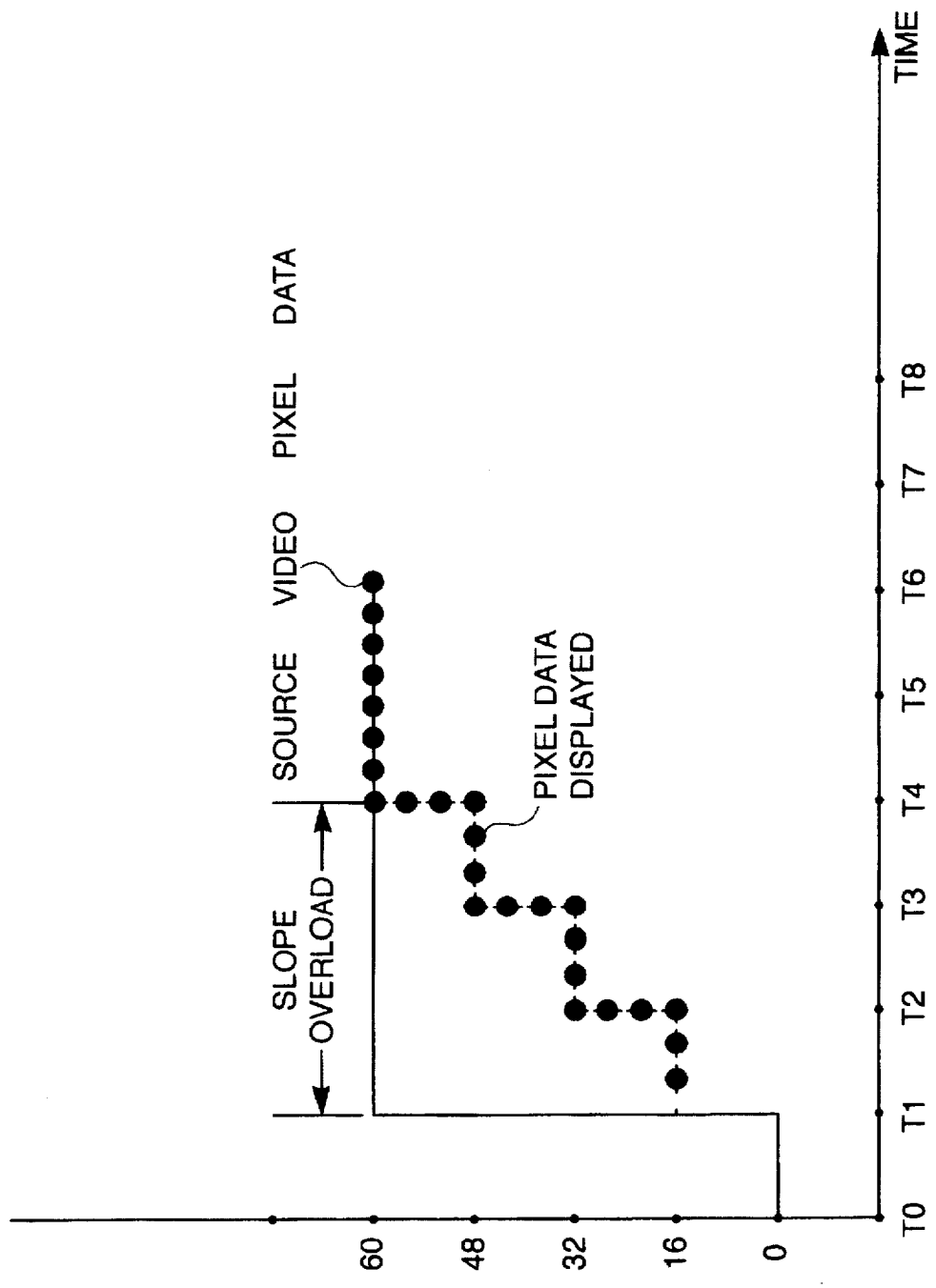
FIG. 7 is a graph illustrating slope overload condition in DPCM encoding.
Figure 8:
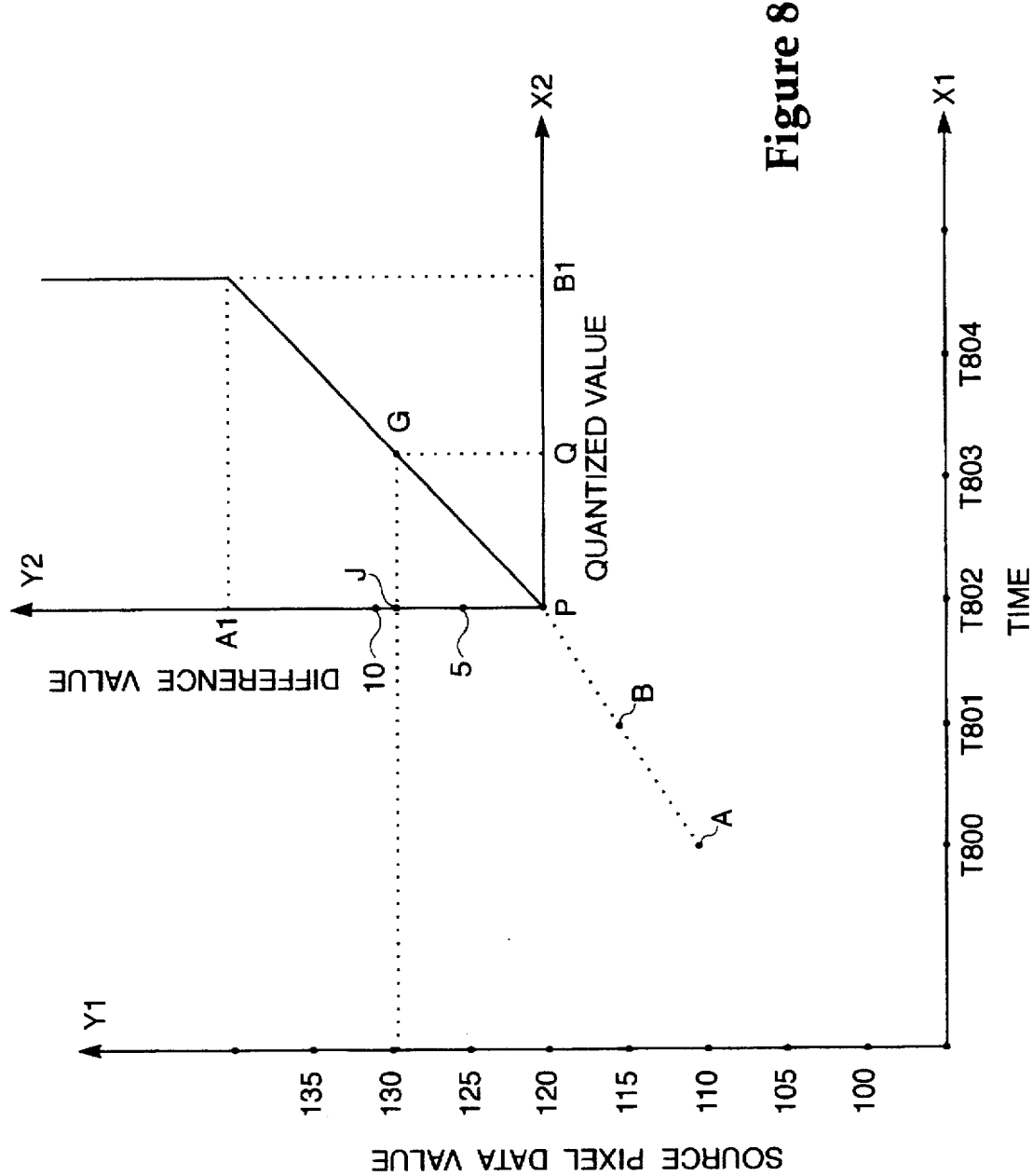
FIG. 8 is a graph illustrating an example of DPCM encoding.

FIG. 6 is a more detailed block diagram illustrating operation of DPCM Encoder 510 and DPCM Decoder 520 in a preferred embodiment of the present invention. Adders 605 and 615, Recoverer 612, and Quantizer 610 in DPCM Encoder 510 together generate DPCM compressed data stored in Local Memory 550. On the other hand, Recoverer 650, Adder 655, and Predictor 660 together decode DPCM compressed data to generate pixel data in RGB format.

Override circuitry of the present invention may comprise Multiplexors 625 and 665, Recoverers 630 and 645, Quantizer 635, and Offset Storage 640 and is designed to prevent a slope overload condition while processing a first pixel in a scan line. Override circuitry operates to generate a predicted value which is a function of first pixel while generating compressed data for the first pixel. As the predicted value is generated from the first pixel data itself, a slope overload condition may be avoided while displaying pixel data around first pixel data.

Adder 605 receives pixel data of source video (eight bits of one of the RGB components) on line 493 and a predicted value on line 606, and subtracts the predicted value from the pixel data. Adder 605 may further comprise a clamp circuit to clamp the result of subtraction to within a predetermined range. Such range may be varied by means of a value stored in a register. In a preferred embodiment, two ranges {−128 to +127 } and {−256 to +255} may be supported.

Quantizer 610 may receive the output of Adder 605 and quantizes the received value. Quantizer 610 may be conventional in the art and may be either linear or nonlinear. In the case of a linear quantizer, Quantizer 610 may comprise a shift circuit logic to capture the least significant four bits. In a preferred embodiment, a switched non-linear quantizer may be used which is well-known in the art. The resulting four bits may be stored in Local Memory 550.

Recoverer 612 accepts as input the quantized four bits and generates an output of eight bits recovered value. In a preferred embodiment, a non-linear recoverer may be employed. Adder 615 adds the predicted value received on line 614 and output of Recoverer 612.

Predictor 620 receives the output of Adder 615 and predicts a next pixel value. In the preferred embodiment, Predictor 620 may comprise a linear predictor including a set of flip-flops with each flip-flop storing a bit of the output of Adder 615. Higher order predictors making use of outputs of multiple prior iterations may be employed and are conventional in the art.

Multiplexor 625 along with Recoverer 630 and Quantizer 635 serves to override output of Predictor 620 when a first pixel of a scan line is received on line 493. Such a overriding function is necessary because pixel data prior to first pixel may be non-existent, and Predictor 620 may have predicted a undefined or indeterminate value.

Hence in the absence of the overriding circuit, a slope overload condition may be present while displaying a video signal. The slope overload condition leads to a display wherein the edges are blurred but gradually brightening as the display is observed towards the center. The override circuitry of FIG. 6 operates to prevent such blurring at the left hand edge of video display.

Referring to FIG. 6 again, Quantizer 635 typically quantizes first pixel data to generate a four bit data value. In a preferred embodiment, Quantizer 635 may comprise a non-linear quantizer well known in the art. If a linear quantizer is implemented, the quantized value may comprise the most significant four bits of the first pixel of a scan line. Recoverer 630 may generate a recoverer value comprising eight bits from the quantized value to generate a predicted value as a function of first pixel data. Hence, in effect, Quantizer 635 and Recoverer 630 operate to generate a predicted value as a function of first pixel data of a scan line.

Multiplexor 625 receives as inputs output of Predictor 620 and output of Recoverer 630, and selects one of the two inputs under control of first pixel select line 631. First pixel select line 631 causes Multiplexor 625 to normally select as output the output Predictor 620, but causes to select output of Recoverer 630 when the pixel processed is a first pixel of the scan line. Therefore, DPCM Decoder 420 of the present invention may include a communication path to receive the predicted value of the first pixel from DPCM encoder 410.

Therefore, when first pixel data of a scan line is processed, predicted value which is a function of first pixel data is passed on line 606 as input to Adder 605. As the other input of Adder 605 is the first pixel data itself, the result of subtraction may fit within aperture of Quantizer 610. Hence, the input to Quantizer 610 is within aperture of Quantizer 610 and a slope overload condition is avoided.

Offset Storage 640, Recoverer 645, and Multiplexor 665 operate to coordinate the override function in the DPCM Decoder 520. Offset Storage 640 stores the four bit quantized value generated by Quantizer 635. Recoverer 645 generates eight bits from the quantized value stored in Offset Storage 640.

Multiplexor 665 operates to select as output an input from Recoverer 645 while processing first pixel of a scan line, and input from Predictor 660 while processing subsequent pixels within a scan line. Therefore, the override function is coordinated in both DPCM Encoder 510 and DPCM Decoder 520.

Recoverer 650 retrieves compressed pixel data (four bits per pixels) from Local Memory 550, and generates an eight bit recovery value as output. Recoverer 650 generates an eight bit recoverer value from compressed four bits similar to Recoverer 612.

Adder 655 adds the recovered value received from Recoverer 650 and the predicted value received from Multiplexor 665 to generate the pixel data value for use by Interpolator 490.

Predictor 660 receives the output of Adder 655 to generate a predicted value for the next pixel. Predictor 660 operates analogous to Predictor 620, and in the preferred embodiment may comprise a set of flip-flops to store a bit of the output of Adder 655, which is the predicted value.

Hence, DPCM Encoder 510 generates a DPCM code of the source video pixel data and the DPCM Decoder 520 decodes the DPCM code to generate pixel data values for interpolator 490. DPCM Encoder 510 and DPCM Decoder 520 together further include a override circuitry to avoid slope overload condition while processing a first pixel of a scan line. It will be further appreciated that the override circuitry may also be used in any slope overload situations including while processing pixels in other edges.

The operation of DPCM Encoder 510 and DPCM Decoder 520 is further illustrated with reference to an example. For the purpose of this example, linear quantizers are assumed. Assume that the first two pixels on a scan line are B4 and B9 respectively. Assume also that Predictor 620 has predicted a value of 0 for the first pixel.

To process first pixel data B4, Quantizer 635 generates four bits representing "B" which is stored in Offset Storage 640. Recoverer 630 generates a recoverer value of B0 by padding four zeroes into the least significant bit positions. Mux select signal line 631 is asserted to select B0 from Recoverer 630 instead of 00 from Predictor 620.

Adder 605 subtracts B0 received from Multiplexor 625 from the first pixel value B4 to generate 04, which is fed to Quantizer 610. Linear Quantizer 610 generates four bits representing 4, which is stored in Local Memory 550.

Recoverer 612 receives four bits representing 4, and generates eight bits representing 04. Adder 615 adds B0 (i.e. output of Multiplexor 625) and 04 (output of Recoverer 612) to generate B4. Since Predictor 620 of first order is assumed, Predictor 620 stores B4 as predicted value for the next pixel which is provided to Adder 605 through Multiplexor 625.

On the DPCM Decoder 520 side, Recoverer 650 receives four bits representing 4 from Local Memory 550, and generates eight bits representing 04. In parallel, Recoverer 645 retrieves four bits with value B from Offset Storage 640, and generates eight bits representing B0. Since B0 corresponds to the first pixel, Multiplexor 665 selects as output the B0 value stored in Recoverer 645.

Adder 655 adds B0 (output of Multiplexor 665) to 04 (value received from Recoverer 650) to generate B4—the pixel value sent to Interpolator 490. The value B4 is stored as predicted value in Predictor 660.

To process second pixel B9, Adder 605 subtracts predicted value B4 (generated while processing first pixel) from B9 to generate eight bits representing 05. Quantizer 610 quantizes the eight bits to (assuming a linear quantizer) four bits representing 5, which is stored in Local Memory 550.

Recoverer 650 of DPCM Decoder 520 receives four bits representing 5, and generates eight bits representing 05. Adder 655 adds the predicted value B4 to 05 to generate the pixel data value B9 sent to Interpolator 490.

Therefore, Graphics Controller 220 of the present invention decreases the number of successive accesses to different rows by retrieving the whole scan line and storing the corresponding pixels in a memory. Also, Graphics Controller 220 minimizes the size of local memory required to store scan lines for interpolation by having DPCM Encoder 510 store the pixels in a compressed format. In addition, Graphics Controller 220 provides a override circuitry to avoid a slope overload condition while compressing first pixel data.

Although the present invention has been illustrated and described in detail, it is clearly understood that the same is by way of illustration and example only and is not to be taken by way of limitation, the scope and spirit of the present invention being limited only by the terms of the appended claims.

What is claimed is:

1. A graphics controller for upscaling a source video image to generate an upscaled video image, the source video image comprising at least a present scan line and a subsequent scan line with each scan line comprising a set of pixel data including a first pixel data, the graphics controller comprising:

an encoder for receiving a set of pixel data for the present scan line, and generating a predicted value for each pixel data normally from at least one prior pixel data within the present scan line, the encoder generating a compressed pixel data set comprising a compressed pixel data for each pixel data by quantizing each pixel data with respect to the corresponding predicted value, said encoder having a predetermined quantization aperture;

an override to cause the encoder to generate a predicted value for the first pixel data of the present scan line from at least the first pixel data, the difference between the predicted value and the first pixel data being within the quantization aperture of the encoder;

a local memory coupled to receive and store the compressed pixel data set;

a decoder for decompressing the compressed pixel data set stored in the local memory to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image.

2. The graphics controller circuit of claim 1 wherein the decoder circuit comprises a DPCM decoder and the encoder circuit comprises a DPCM encoder.

3. A graphics controller circuit for upscaling a source video image to generate an upscaled video image, the source video image comprising at least a present scan line and a subsequent scan line with each scan line comprising a set of pixel data including a first pixel data, the graphics controller circuit comprising:

an encoder circuit for receiving a set of pixel data for the present scan line, and generating a predicted value for each pixel data normally from at least one prior pixel data within the present scan line, the encoder circuit generating a compressed pixel data set comprising a compressed pixel data for each pixel data as a function of the corresponding predicted value;

an override circuit to cause the encoder circuit to generate a predicted value for the first pixel data of the present scan line from at least the first pixel data;

a local memory coupled to receive and store the compressed pixel data set;

a decoder circuit for decompressing the compressed pixel data set stored in the local memory to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image, wherein the decoder circuit comprises a DPCM decoder and the encoder circuit comprises a DPCM encoder, and wherein the DPCM encoder comprises:

a first adder for receiving each pixel data of the present scan line and a corresponding predicted value, the first adder generating a difference of the pixel data and the corresponding predicted value;

a first quantizer for generating the compressed pixel data set by quantizing the difference for each pixel data;

a first recoverer circuit for generating a recoverer value from the compressed pixel data set;

a second adder for adding the recoverer value with the predicted value to generate an output; and a first predictor for generating the predicted value for a next pixel as a function of the output of the second adder.

4. The graphics controller circuit of claim 3 wherein the override circuit comprises:

a second quantizer and a second recoverer for generating the predicted value for the first pixel; and a first multiplexor for selectively coupling the predicted value for the first pixel while processing the first pixel data, and for coupling the predicted value generated by the first predictor when processing subsequent pixel data.

5. The graphics controller circuit of claim 4 wherein the decoder circuit comprises:

a third recoverer coupled to the local memory for receiving each compressed data, and for generating a third recoverer value corresponding to each compressed data;

a second predictor for generating a second predicted value for each pixel data;

a second multiplexor coupled to receive the predicted value for the first pixel and the second predicted value for each decompressed pixel data, the multiplexor selecting as output the predicted value for the first pixel when the third adder receives the third recoverer value corresponding to the first pixel data, and the second predicted value otherwise; and a third adder coupled to the third recoverer and the second multiplexor for adding the output of second multiplexor to corresponding third recoverer value to generate the decompressed pixel data set.

6. The graphics controller circuit of claim 5, further comprising an MVA block wherein the MVA block comprises the DPCM encoder, the DPCM decoder, and the local memory.

7. A graphics controller circuit for upscaling a source video image to generate an upscaled video image, the source video image comprising at least a present scan line and a subsequent scan line with each scan line comprising a set of pixel data including a first pixel data, the graphics controller circuit comprising:

an encoder circuit for receiving a set of pixel data for the present scan line, and generating a predicted value for each pixel data normally from at least one prior pixel data within the present scan line, the encoder circuit generating a compressed pixel data set comprising a compressed pixel data for each pixel data as a function of the corresponding predicted value;

an override circuit to cause the encoder circuit to generate a predicted value for the first pixel data of the present scan line from at least the first pixel data;

a local memory coupled to receive and store the compressed pixel data set;

a decoder circuit for decompressing the compressed pixel data set stored in the local memory to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image, wherein the decoder circuit comprises a DPCM decoder and the encoder circuit comprises a DPCM encoder, and wherein the decoder circuit is coupled to receive the predicted value of the first pixel of the present scan line, and wherein the decoder generates a decompressed pixel data for the first pixel from the predicted value for the first pixel data and the compressed pixel data for the first pixel data.

8. A computer system for displaying a source video image on a display unit, said source video image comprising a plurality of scan lines with each scan line comprising a set of pixel data, comprising at least a present scan line and a subsequent scan line with each scan line comprising a set of pixel data including a first pixel data, said computer system comprising:

a display memory for storing graphics/text data;

a display unit; and a graphics controller receiving pixel data of said source video image and said graphics/text data, and upscaling said source video image to generate an upscaled video image prior to displaying said graphics/text and said upscaled source video image on said display unit, said graphics controller comprising:

an encoder, having a predetermined quantization aperture, for receiving a set of pixel data for the present scan line, the encoder generating a predicted value for the first pixel data of the present scan line as a function of the first pixel data, and generating a predicted value for other pixel data from at least one prior pixel data within the present scan line, the encoder generating a compressed pixel data set comprising a compressed pixel data for each pixel data by quantizing each pixel data with respect to the corresponding predicted value; the difference between the predicted value and the first pixel data being within the quantization aperture of the encoder;

a local memory coupled to receive and store the compressed pixel data set;

a decoder for retrieving the compressed pixel data set in the local memory and for decompressing the compressed pixel data set to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image.

9. The computer system of claim 8 wherein the decoder circuit comprises a DPCM decoder and the encoder circuit comprises a DPCM encoder.

10. A computer system for displaying a source video image on a display unit, said source video image comprising a plurality of scan lines with each scan line comprising a set of pixel data, comprising at least a present scan line and a subsequent scan line with each scan line comprising a set of pixel data including a first pixel data, said computer system comprising:

a display memory for storing graphics/text data;

a display unit; and a graphics controller circuit receiving pixel data of said source video image and said graphics/text data, and upscaling said source video image to generate an upscaled video image prior to displaying said graphics/ text and said upscaled source video image on said display unit, said graphics controller circuit comprising:

an encoder circuit for receiving a set of pixel data for the present scan line, the encoder circuit generating a predicted value for the first pixel data of the present scan line as a function of the first pixel data, and generating a predicted value for other pixel data from at least one prior pixel data within the present scan line, the encoder circuit generating a compressed pixel data set comprising a compressed pixel data for each pixel data as a function of the corresponding predicted value;

a local memory coupled to receive and store the compressed pixel data set;

a decoder circuit for retrieving the compressed pixel data set in the local memory and for decompressing the compressed pixel data set to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image, wherein the decoder circuit comprises a DPCM decoder and the encoder circuit comprises a DPCM encoder, and wherein the DPCM encoder comprises:

a first adder for receiving each pixel data of the present scan line and a corresponding predicted value, the first adder generating a difference of the pixel data and the corresponding predicted value;

a first quantizer for generating the compressed pixel data set by quantizing the difference for each pixel data;

a first recoverer circuit for generating a recoverer value from the compressed pixel data set;

a second adder for adding the recoverer value with the predicted value to generate an output; and a predictor for generating the predicted value for a next pixel as a function of the output of the second adder; and a override circuit for generating the predicted value for the first pixel as a function of the first pixel.

11. The computer system of claim 10 wherein the override circuit comprises:

a second quantizer and a second recoverer for generating the predicted value for the first pixel; and a first multiplexor for selectively coupling the predicted value for the first pixel while processing the first pixel data, and for coupling the predicted value generated by the predictor when processing subsequent pixel data.

12. The computer system of claim 11 wherein the decoder circuit comprises:

a third recoverer coupled to the local memory for receiving each compressed data, and for generating a third recoverer value corresponding to each compressed data;

a second predictor for generating a second predicted value for each pixel data;

a second multiplexor coupled to receive the predicted value for the first pixel and the second predicted value for each decompressed pixel data, the multiplexor selecting as output the predicted value for the first pixel when the third adder receives the third recoverer value corresponding to the first pixel data, and the second predicted value otherwise; and a third adder coupled to the third recoverer and the second multiplexor for adding the output of second multiplexor to corresponding third recoverer value to generate the decompressed pixel data set.

13. The computer system of claim 12 further comprising a MVA block wherein the MVA block comprises the DPCM encoder, the DPCM decoder, and the local memory.

14. A computer system for displaying a source video image on a display unit, said source video image comprising a plurality of scan lines with each scan line comprising a set of pixel data, comprising at least a present scan line and a subsequent scan line with each scan line comprising a set of pixel data including a first pixel data, said computer system comprising:

a display memory for storing graphics/text data;

a display unit; and a graphics controller circuit receiving pixel data of said source video image and said graphics/text data, and upscaling said source video image to generate an upscaled video image prior to displaying said graphics/text and said upscaled source video image on said display unit, said graphics controller circuit comprising:

an encoder circuit for receiving a set of pixel data for the present scan line, the encoder circuit generating a predicted value for the first pixel data of the present scan line as a function of the first pixel data, and generating a predicted value for other pixel data from at least one prior pixel data within the present scan line, the encoder circuit generating a compressed pixel data set comprising a compressed pixel data for each pixel data as a function of the corresponding predicted value;

a local memory coupled to receive and store the compressed pixel data set;

a decoder circuit for retrieving the compressed pixel data set in the local memory and for decompressing the compressed pixel data set to generate a decompressed pixel data set; and an interpolator for receiving the decompressed pixel data set and a set of pixel data for the subsequent scan line of the source video, the interpolator interpolating the decompressed pixel data set and the set of pixel data for the subsequent scan line to generate a set of additional pixel data comprised in the upscaled video image, wherein the decoder circuit comprises a DPCM decoder and the encoder circuit comprises a DPCM encoder, and wherein the decoder circuit is coupled to receive the predicted value of the first pixel of the present scan line, and wherein the decoder generates a decompressed pixel data for the first pixel from the predicted value for the first pixel data and the compressed pixel data for the first pixel data.

15. A decoder circuit for decoding a set of compressed pixel data corresponding to a scan line, wherein an encoder generates a predicted value for each pixel data normally as a function of at least one prior pixel data in the scan line and as a function of a first pixel data for the first pixel data, and wherein the encoder generates each of compressed pixel data as a function of the corresponding predicted value and the pixel data, the decoder circuit comprising:

a recoverer for receiving each compressed pixel data, and for generating a recoverer value corresponding to the compressed data;

a predictor for generating a predicted value for each compressed pixel data;

a multiplexor coupled to receive the predicted value for the first pixel and the predicted value for each decompressed pixel data, the multiplexor selecting as output the predicted value for the first pixel while processing the compressed pixel data for the first pixel, and the predicted value for each compressed data otherwise; and an adder coupled to the recoverer and the multiplexor for adding the output of the multiplexor to corresponding recoverer value to generate the decompressed pixel data set.

16. A method of upscaling a source video image in a graphics controller circuit, said source video image comprising a present scan line and subsequent scan line with each scan line comprising a set of pixel data, said method comprising the steps of:

receiving a present scan line including a first pixel data of said source video image;

generating a predicted value for the first pixel data of the present scan line as a function of the present pixel data, and generating a predicted value for other pixel data from at least one prior pixel data within the present scan line;

generating a compressed pixel data set comprising a compressed pixel data for each pixel data as a function of the corresponding predicted value;

storing the compressed pixel data set in a memory;

retrieving the compressed pixel data set in the memory;

decompressing the compressed pixel data set to generate a decompressed pixel data set; and interpolating the decompressed pixel data set and the set of pixel data for the subsequent scan line to generate a set of additional pixel data comprised in the upscaled video image.

17. The method of claim 16 wherein said step of generating a compressed pixel data set comprises the step of using differential pulse code modulating (DPCM).

18. The method of claim 17 further comprising the step of providing the predicted value for the first pixel to step of decompressing, wherein the step of decompressing uses the predicted value of the first pixel data to generate the decompressed pixel data set.

19. A method for quantizing video data, the video data comprising at least a present scan line and a subsequent scan line with each scan line comprising a set of pixel data including a first pixel data, the method comprising the steps of:

receiving a set of pixel data for the present scan line, quantizing a pixel data relative to a first predicted value generated from at least one prior pixel data within the present scan line if the difference between the predicted value and the pixel data is within a predetermined quantization aperture, and quantizing a pixel data relative to a second predicted value generated from at least the pixel data if the difference between the first predicted value and the pixel data is greater than the predetermined quantization aperture.

20. An apparatus for quantizing video data, the video data comprising at least a present scan line and a subsequent scan line with each scan line comprising a set of pixel data including a first pixel data, the apparatus comprising:

means for receiving a set of pixel data for the present scan line;

means for quantizing a pixel data relative to a first predicted value generated from at least one prior pixel data within the present scan line if the difference between the predicted value and the pixel data is within a predetermined quantization aperture; and means for quantizing a pixel data relative to a second predicted value generated from at least the pixel data if the difference between the first predicted value and the pixel data is greater than the predetermined quantization aperture.

* * * * *